M. E. KIRKPATRICK.
CORN HEADING MACHINE.
APPLICATION FILED APR. 5, 1916.
1,314,080.
Patented Aug. 26, 1919.
2 SHEETS—SHEET 1.
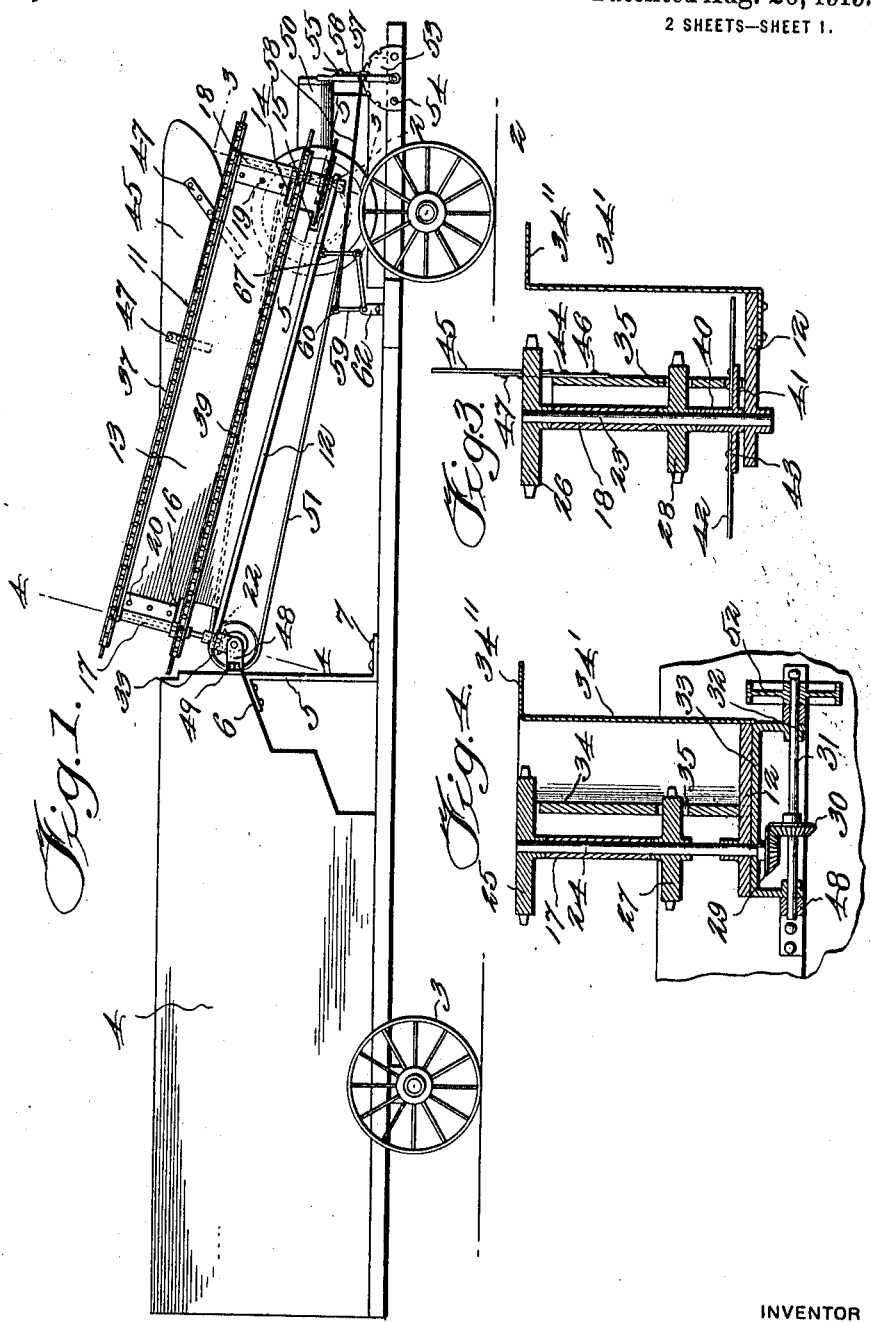
WITNESSES
INVENTOR
Marion E. Kirkpatrick,
BY
ATTORNEY

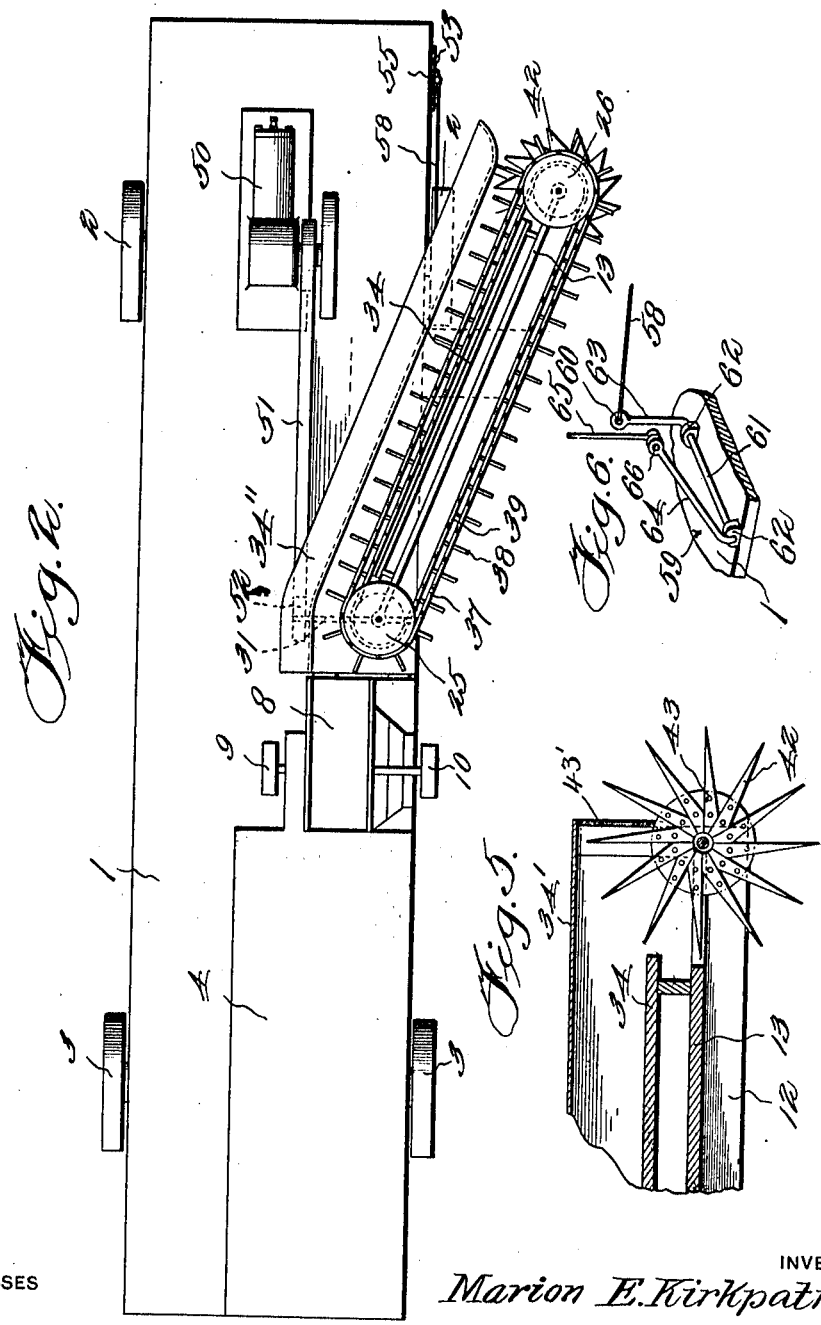

UNITED STATES PATENT OFFICE.

MARION E. KIRKPATRICK, OF APACHE, OKLAHOMA.

CORN-HEADING MACHINE.

1,314,080.　　　　　Specification of Letters Patent.　　Patented Aug. 26, 1919.

Application filed April 5, 1916. Serial No. 89,207.

*To all whom it may concern:*

Be it known that I, MARION E. KIRKPATRICK, a citizen of the United States, residing at Apache, in the county of Caddo and State of Oklahoma, have invented certain new and useful Improvements in Corn-Heading Machines, of which the following is a specification.

This invention relates to harvesters and more particularly to an improved corn topping or heading machine.

The primary object of the invention is to provide a harvester of the type described, whereby Kafir corn, broom corn and sorghum may be headed or topped without doing material injury to the stalk, and also so severing the top as to leave the stalk standing.

Another important characteristic of the invention, resides in the provision of means whereby the heading mechanism may be so adjusted as to accommodate stalks of varying heights thus enabling the harvester to be used under varying conditions.

It is also contemplated by the invention to provide the construction with endless carriers, one of the said carriers being moved at a greater rate of speed than the remaining carrier, consequently allowing the tops to be uniformly laid before they are introduced into the thresher.

The annexed drawings and the following description, set forth in detail certain mechanism embodying the invention, such disclosed means however constituting but one of the various mechanical forms in which the principle of the invention may be used.

In said annexed drawings:—

Figure 1 is a side elevation showing my improved header as applied to a thresher;

Fig. 2 is a top plan;

Fig. 3 is a section on the line 3—3 of Fig. 1;

Fig. 4 is a section on the line 4—4 of Fig. 1;

Fig. 5 is a section taken on line 5—5 of Fig. 1 looking in the direction of the arrows; and Fig. 6 is a detail in perspective of the elements used for adjusting the header to accommodate stalks of varying heights.

Referring now more particularly to the drawings wherein like reference characters designate like or corresponding parts throughout the several views thereof, I provide a supporting frame 1, the said frame being mounted upon forward and rear wheels 2 and 3 and having arranged upon one portion thereof, a threshing machine as at 4. To provide for means whereby the forward end of the thresher may be braced for a purpose which will be subsequently apparent, I provide an angle bracket or standard as at 5, securing one end thereof to a portion of the thresher as at 6, while the remaining end is secured to the frame 1 as at 7. The thresher is also provided with a conventional form of feeding hopper 8, which contains suitable feeding mechanism driven by the shafting 9 and 10, which shafting is mounted in suitable bearings adjacent said hopper.

Referring now to the present invention, it may be said that the same comprises a supporting frame designated in its entirety at 11. This frame includes a base portion 12 which portion has secured thereto a vertically disposed supporting and division plate 13, one end of the plate being cut away as at 14 and recessed as at 15, while the remaining end is also provided with a cutaway portion 16. Vertically supported shaft bearings 17 and 18 are secured to the opposite ends of said plate 13, as at 19 and 20. Arranged within these shaft bearings 17 and 18 and extending through suitable openings arranged in the opposite end of the supporting base 12, as at 21 and 22, are shafts 23 and 24, which shafts have keyed to their upper extremities sprocket wheels 25 and 26, while keyed thereto adjacent their lower extremities are sprocket wheels 27 and 28, it being noted, these sprocket wheels are of less diameter than the wheels 25 and 26. The shaft 24 is provided with an elongated portion, which portion has affixed thereto a beveled gear 29, which gear meshes with a similar gear 30 carried upon the driving shaft 31 journaled in suitable bearings 32 branched in a supporting bracket 33, carried by the base portion 12 and in alinement with the said shaft 24, having a suitable opening to allow the elongated extension of said shaft to be passed therethrough. The vertically disposed supporting and division plate 13 has affixed thereto by supporting blocks 34ª a similarly disposed plate 34 provided with openings 35, whereby a portion of the sprocket wheels 27 and 28 may be introduced therethrough. This plate 34 serves as efficient means for supporting the tops as severed from the stalks and also serves to brace the conveyers throughout their travel which construction will be hereinafter described.

Secured to the outer marginal edge of the base 12 is a second vertically disposed guiding plate 34', the same being constructed from bendable metal and provided with an offset arm portion 34". Arranged about the larger sprocket wheels 25 and 26 is a sprocket chain 37, which sprocket chain has secured thereto, laterally extended fingers 38, the same being arranged thereupon at spaced intervals to provide for substantially pocket-like members. The smaller sprocket wheels 27 and 28 have arranged thereabout a second sprocket chain 39, which chain is constructed in exact accordance with the chain 37, except for the fact that the same is of less length.

In order that means may be provided for whereby the corn tops may be severed from the stalks, I key to the shaft 23, adjacent its lower extremity, a collar 40 which collar is provided with a laterally extending annular flange 41. Secured to this flange 41 are a plurality of cutting knives 42, the same being held in fixed relation by means of rivets 43 or other similar fastening devices. It will also be noted that the forward end of the conveying chain is provided with a severing blade 43' as illustrated in Fig. 5.

To prevent the heads from falling when first engaged by the gathering and conveying means, I secure to the plates 34 by bracket members 44, a tapering guide plate 45, the said bracket members 44 being secured to the plate 34 as at 46 and to the guide plate as at 47. Thus it will be obvious when the corn is first engaged by the header the guide plate 45, will serve as efficient means for holding the same in a substantially vertical position, in order that the conveying thereof may be facilitated, as well as the cutting or severing action.

A bracket or supporting member 48 is secured to the forward end of the threshing machine, the bracket connection being designated as at 49. Suitable journals are arranged in the forward end of the bracket arm, whereby the driving shaft 31 may be supported for pivotal movement.

Referring now to the driving or operating mechanism and to the means whereby the header construction may be adjusted to accommodate stalks of various sizes, I propose to mount upon the frame 1, an engine 50 or other suitable prime mover. Belt gearing 51 is connected with the drive wheel of the engine and extends forward into engagement with a driving wheel 52 keyed to the outer extremity of the driving shaft 31. Upon rotation of the driving shaft 31 through the medium of the prime mover 50, it will be apparent that the shaft 24 will, by reason its gearing with said shaft 31 be rotated, causing the sprocket wheels 25 and 27 to be rotated, which motion will be imparted to the sprocket chains 37 and 39 and in turn, to the sprocket wheels 26 and 28, whereupon the cutting knives 42 will be rotated, and, of course, when brought into engagement with corn stalks, will efficiently serve to sever the heads thereof, therefrom. As to the adjusting means, a quadrant 53 is secured to one side of the frame 1 as at 54, having associated therewith, the usual pivotally mounted lever 55, carrying a sliding pawl 56 adapted to be engaged with the various seats or notches on the curved marginal edge of quadrant. Pivotally secured to the lever 55 as at 57 is a rod 58, which rod extends into pivotal engagement with the adjusting element 59, as at 60. This adjusting element comprises a horizontal body portion or bar 61 rotatably supported by apertured lugs or bearings 62 upon the base 1. One end of the rod 61 is bent at right angles thereto to afford a substantially vertical arm 63, while the remaining end of the rod 61 is also bent upwardly at an angle to provide the offset arm 64. A connecting link or rod 65 is pivotally secured to the end of the arm 64 as at 66, and extends upwardly into pivotal engagement with a bearing 67 carried upon the lower face of the supporting base 12.

Should the user or operator desire to adjust the heading mechanism, it is only necessary that the lever be either moved forwardly or backwardly upon its pivot, whereupon the adjusting element 59 will be oscillated, causing the said heading mechanism, through the medium of the connecting link 65, to be raised or lowered, depending upon the motion of the operating member 55. When the desired adjustment has been obtained, the sliding pawl 56 carried by the lever is then moved into engagement with one of the quadrant teeth, thus affording means whereby the said heading mechanism may be maintained in the adjusted position.

In reviewing the operation of the structure, it will be noted as the frame 1 is drawn along, the fingers 38 upon the sprocket chains or conveyers 37 and 39 will engage the heads of the stalks whereupon the rotating cutting knives 42 will sever the heads from the stalks. When severed, the tops will be carried upwardly and backwardly causing the tops to be efficiently fed into the hopper 8 of the threshing machine.

Other modes of applying the principle of my invention may be employed instead of the one explained, change being made as regards the mechanism herein disclosed, provided the means stated by the following claim or the equivalent of such stated means be employed.

I, therefore particularly point out and distinctly claim as my invention:—

In a device of the class described, the combination of a supporting machine, a supporting frame carried by said machine and consisting of a base, drive shafts extending vertically from said base, means for rotating said shafts, a division plate having vertical bearings directly secured upon its ends and engaging the said shafts for steadying said shafts, said division plate being carried by said base, whereby the plate and shafts will reinforce each other, said division plate having cut away portions at its ends communicating with said base and directly below said bearings, a recess portion extending inwardly beyond one of the cut away portions, a knife carried upon one shaft and extending into the recessed portion, sprockets carried by said shaft and extending above said plate and also into said cut away portion, conveyer chains passing around said sprockets, a supporting plate extending parallel to said first mentioned plate, blocks secured to the first mentioned plate and to the second mentioned plate for properly supporting the second mentioned plate from the first mentioned plate and a guide plate fixed upon said base and extending parallel to said second mentioned plate thus forming a restricted passage between the second mentioned plate and the guide plate to prevent stalks being conveyed from falling over and clogging the device.

In testimony whereof I affix my signature in presence of two witnesses.

MARION E. KIRKPATRICK.

Witnesses:
A. C. DOLF,
W. F. CLARK.

Copies of this patent may be obtained for five cents each, by addressing the "Commissioner of Patents, Washington, D. C."